US010380229B2

(12) United States Patent
Davies et al.

(10) Patent No.: US 10,380,229 B2
(45) Date of Patent: Aug. 13, 2019

(54) METHOD AND SYSTEM PROVIDING CONTEXTUAL FUNCTIONALITY IN STATIC WEB PAGES

(71) Applicant: Google LLC, Mountain View, CA (US)

(72) Inventors: Scott Davies, Santa Monica, CA (US); Justin Lewis, San Francisco, CA (US)

(73) Assignee: Google LLC, Mountain View, CA (US)

(*) Notice: Subject to any disclaimer, the term of this patent is extended or adjusted under 35 U.S.C. 154(b) by 42 days.

(21) Appl. No.: 15/384,793

(22) Filed: Dec. 20, 2016

(65) Prior Publication Data

US 2018/0173684 A1 Jun. 21, 2018

(51) Int. Cl.
| | | |
|---|---|---|
| G06F 17/00 | (2019.01) | |
| G06F 17/22 | (2006.01) | |
| G06F 17/27 | (2006.01) | |
| G06F 16/955 | (2019.01) | |
| G06F 16/958 | (2019.01) | |
| H04L 29/08 | (2006.01) | |
| G06F 16/95 | (2019.01) | |
| G06F 16/957 | (2019.01) | |

(52) U.S. Cl.
CPC .......... *G06F 17/2247* (2013.01); *G06F 16/95* (2019.01); *G06F 16/955* (2019.01); *G06F 16/958* (2019.01); *G06F 16/9574* (2019.01); *G06F 17/2235* (2013.01); *G06F 17/2705* (2013.01); *H04L 67/02* (2013.01)

(58) Field of Classification Search
USPC ........................................ 715/234, 203, 204
See application file for complete search history.

(56) References Cited

U.S. PATENT DOCUMENTS

| | | | |
|---|---|---|---|
| 9,292,467 B2 | 3/2016 | Connolly et al. | |
| 9,411,786 B2* | 8/2016 | Soni | G06F 17/2235 |
| 2005/0125285 A1* | 6/2005 | McQueeney | G06F 21/10 |
| | | | 705/14.4 |
| 2012/0179955 A1* | 7/2012 | French | G06F 17/30899 |
| | | | 715/207 |
| 2013/0111328 A1* | 5/2013 | Khanna | G06F 17/30893 |
| | | | 715/234 |
| 2016/0142517 A1 | 5/2016 | Chor | |
| 2016/0148262 A1 | 5/2016 | Glover et al. | |

(Continued)

OTHER PUBLICATIONS

Critchlow, "What you need to know about accelerated mobile pages (AMPs)", Dec. 18, 2015, located at https://moz.com/blog/accelerated-mobile-pages-whiteboard-Friday), pp. 3-4.*

(Continued)

*Primary Examiner* — Stephen S Hong
*Assistant Examiner* — Matthew J Ludwig
(74) *Attorney, Agent, or Firm* — McDermott Will & Emery LLP

(57) ABSTRACT

Aspects of the disclosed technology include a method including receiving, by a computing device, static web page data of a web page; responsive to receiving the static web page data, parsing, by the computing device, the static web page data to identify a plurality of links; selecting, by the computing device, a link of the identified plurality of links to be presented based on a computing environment; rendering, by the computing device, the web page including the selected link; and outputting, for display, the rendered web page.

19 Claims, 10 Drawing Sheets

(56) References Cited

U.S. PATENT DOCUMENTS

2017/0060823 A1* 3/2017 Zheng .................. G06F 17/2235
2017/0192766 A1* 7/2017 Sogani ...................... G06F 8/61
2017/0193087 A1* 7/2017 Savliwala ......... G06F 17/30684
2018/0025012 A1* 1/2018 Cao ..................... G06F 17/3089

OTHER PUBLICATIONS

Shepard, "The Meta Referrer Tag: An Advancement for SEO and the Internet", Jul. 6, 2015, located at https://moz.com/blog/meta-referrer-tag, p. 4.*
Critchlow, "What you need to know about accelerated mobile pages (AMPs)", published Dec. 18, 2015, located at https://moz.com/blog/accelerated-mobile-pages-whiteboard-Friday.*
Shepard, "The Meta Referrer Tag: An Advancement for SEO and the Internet", published Jul. 6, 2015, located at https://moz.com/blog/meta-referrer-tag.*
David W. Keith, index.html, created Jul. 3, 2014, Github (Year: 2014).*
SitePoint Member, Detect OS and Browser, The SitePoint Forums, 2010 (Year: 2010).*
International Search Report and Written Opinion dated Jan. 19, 2018 in PCT App. No. PCT/US2017/052852.

* cited by examiner

METHOD AND SYSTEM PROVIDING CONTEXTUAL FUNCTIONALITY IN STATIC WEB PAGES

TECHNICAL FIELD

The present disclosure is related generally to context-based functionality, and more particularly to providing the same using static web pages.

BACKGROUND

Access to web pages from a mobile environment, such as a smartphone, has grown extensively in recent years. In the mobile environment, it is particular advantageous to present web pages with as little delay as possible. Enhanced speed may be accomplished through the use of static web pages, such as through the use of accelerated mobile web pages. However, traditional use of static web pages limits the ability to provide contextualized information and effectively track user behavior. For example, using traditional static web pages, a single embedded installation button for a mobile application cannot be made to link to an appropriate application store. Accordingly, there is need for a way to provide enhanced functionality to static web pages.

SUMMARY

Briefly described, and according to one embodiment, aspects of the present disclosure generally relate to enhancements to the use of static web pages. Certain implementations may include a method including: receiving, by a computing device, static web page data of a web page; responsive to receiving the static web page data, parsing, by the computing device, the static web page data to identify a plurality of links; selecting, by the computing device, a link of the identified plurality of links to be presented based on a computing environment; rendering, by the computing device, the web page including the selected link; and outputting, for display, the rendered web page.

According to certain implementations, the computing environment corresponds to an existence status of an application on the computing device, the plurality of links include a first link to an application store and a second link to open the application, and the selecting includes selecting between the first link in response the application not existing on the computing device, and the second link in response to the application existing on the computing device.

According to certain implementations, the computing environment corresponds to an operating system of the computing device, and the plurality of links correspond to different application locations for a same application corresponding to respective operating systems of the computing device.

According to certain implementations, the method further includes: receiving, by the computing device, an indication of a user selection of the selected link; and responsive to receiving the indication, initiating, by the computing device, an opening of the application.

According to certain implementations, the method further includes: in response to the opening of the application being unsuccessful, navigating, by the computing device, to an application page in an application store corresponding to the operating system of the computing device.

According to certain implementations, the method further includes: transmitting, by the computing device, a search query request, with the receiving including receiving, by the computing device, a plurality search results together with the static web page data, the static web page data corresponding to a search result of the plurality of search results; identifying, by the computing device, the application based on the selected link; determining, by the computing device, whether the application exists on the computing device; and storing a result of the determining in a memory.

According to certain implementations, the method further includes: receiving, by the computing device, an indication of a user selection of the selected link; responsive to receiving the indication, referencing, by the computing device, the result stored in the memory and either opening the application in response to the result indicating that the application exists on the computing device, or opening an application store location corresponding to the operating system of the computing device for the application in response to the result indicating that the application does not exist on the computing device.

Certain implementations may include a method including: receiving, by a computing device, static web page data of a web page; responsive to receiving the static web page data, parsing, by the computing device, the static web page data to identify an accelerated mobile page (AMP) tag; extracting, by the computing device, data elements from the AMP tag; constructing, by the computing device, a link based on the extracted data elements and environmental information; rendering, by the computing device, the web page including constructed link; and outputting, for display, the rendered web page.

According to certain implementations, the environmental information includes an indication of an operating system of the computing device, the data elements include identification information of an application, and the constructing includes constructing, by the computing device, the link to direct to the application in an application store, the application store being associated with the operating system of the computing device.

According to certain implementations, the environmental information includes an indication of an existence of an application on the computing device, the data elements include identification information of the application, and the constructing includes constructing, by the computing device, the link to either direct to the application in an application store in response to the application not existing on the computing device, or open the application in response to the application existing on the computing device.

Certain implementations may include a method including: receiving, by a computing device, static web page data of a web page; responsive to receiving the static web page data, parsing, by the computing device, the static web page data to identify a referrer tag corresponding to a link; modifying, by the computing device, the referrer tag to include attribute information; rendering, by the computing device, the web page including the link associated with the modified referrer tag; and outputting, for display, the rendered web page.

According to certain implementations, the modifying includes modifying, by the computing device, the referrer tag to include information corresponding to user identification information of a user of the computing device.

According to certain implementations, the method further includes: transmitting, by the computing device, a search query request. The receiving may include receiving, by the computing results, a plurality search results together with the static web page data, the static web page data may corresponds to a search result of the plurality of search results, and the modifying may include modifying, by the computing device, the referrer tag to include information indicative of the search query request.

According to certain implementations, the method further includes: receiving, by the computing device, an indication of a selection of the link; and responsive to receiving the indication, initiating, by the computing device, a navigation to a destination corresponding to the link and transmitting the attribute information to the destination.

Certain implementations may include a method including: receiving, by a computing device, a web search query from a user device; performing, by the computing device, a search based on the web search query; compiling, by the computing device, a plurality of search results and static web page data of a web page corresponding to a search result of the plurality of search results; parsing, by the computing device, the static web page data to identify a contextual element; modifying, by the computing device, the contextual element of the static web page; and transmitting, to the user device, the search results together with the static web page data containing the modified contextual element, wherein the user device is configured to render and display the web page including the modified contextual element.

According to certain implementations, the method further includes: receiving, by the computing device, environmental information from the computing device. The modifying may include modifying, by the computing device, the contextual element based on the environmental information.

According to certain implementations, the contextual element includes a link and a corresponding referrer tag, and the modifying includes modifying the corresponding referrer tag to include information corresponding to the web search query.

According to certain implementations, the method further includes: receiving, by the computing device, user identification information from the computing device. The contextual element may include a link and a corresponding referrer tag, and the modifying may include modifying the corresponding referrer tag to include information corresponding to the user identification information.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

According to some implementations of the disclosed technology, static web page data may include contextual information. A host may identify the contextual information and modify the static web page based on particular environments. In some cases, the contextual information may include a plurality of links corresponding to respective operating systems, a mutatable referrer tag corresponding to a link, or an AMP tag including information for constructing a link. In some implementations, a hosting server or a user device may interpret the contextual information and render a web page from the static web page data to present a contextualized web page.

Example implementations of the disclosed technology will now be described with reference to the accompanying figures.

Figure 1:
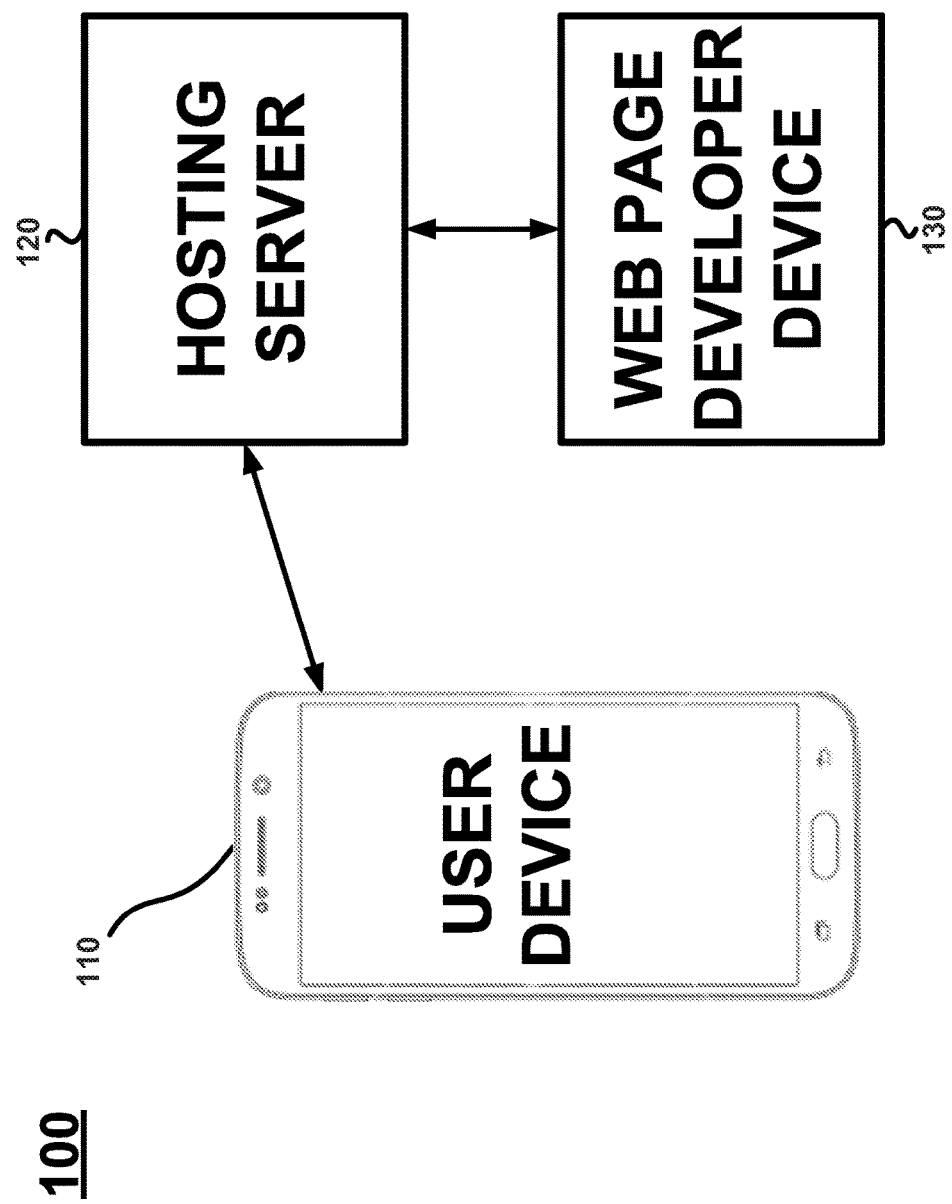
FIG. 1 illustrates an environment in which one or more example embodiments may be implemented.

FIG. 1 illustrates a connected system in which one or more examples of the disclosed technology may be implemented. It will be understood that the networked system 100 is provided for example purposes only, and does not limit the scope of the various implementations of the present disclosed systems and methods.

Referring to FIG. 1, the networked system 100 may include a user device 110, a hosting server 120, and a web page developer device 130. According to some implementations, as non-limiting examples, the user device 110 and the web page developer device 130 may be respective computer devices and may include a personal computer (PC), a mobile computer, a laptop, a desktop, or a Smartphone. According to some implementations, the hosting server 120 may be a computer device, and may include one or more distinct server machines. An example of a computer architecture that may be used to implement one or more of the user device 110, the hosting server 120, and the web page developer device 130 will be discussed below with reference to FIG. 10.

The user device 110 may communicate with the hosting server 120 to access web page data. The web page data may be static web page data. For example, the web page data may be a static HyperText Markup Language (HTML) file. In some embodiments, the user device 110 may parse the static web page data to identify a plurality of links. The user device 110 may select one link from the plurality of links to be displayed based on an environment of the user device 110, e.g., an operating system on the user device 110 or whether an identified application exists on the user device 110. The user device 110 renders the web page including the selected link and displays the rendered web page.

The user device 110 may receive an indication of a selection of a link to the application. The user device 110 may determine whether the application exists on the user device 110 and, in response to determining that the application does not exist on the user device 110, the user device 110 may navigate to a download area for the application. In response to determining that the application exists on the user device 110, the user device may open the application. The user device 110 may determine whether the application exists utilizing functionality provided by an operating system of the user device 110. The user device 110 may open the application to a position identified by the link. In some embodiments, the user device 110 may determine whether the application exists by attempting to open the application.

In some embodiments, the user device 110 may parse the static web page data to identify a plurality of links to an application. The user device 110 may determine whether the application exists on the user device 110. The user device 110 may select one link from the plurality of links to be displayed based on whether the application is installed on the user device. The user device 110 renders the web page including the selected link and displays the rendered web page.

In some embodiments, the user device 110 may parse the static web page data to identify a link to an application. The user device 110 may asynchronously determine whether the application exists on the user device 110, and store information corresponding to the link in a memory cache. In response to a selection of the link, the user device 110 may inspect the memory cache and, based on the cache, either navigate to a download area for the application or open the application.

In some embodiments, the user device 110 may receive information from the hosting server 120 identifying one or more applications referenced in links contained in the web page data. The user device 110 may determine whether the one or more applications exist on the user device 110, and may transmit to the hosting server 120 information indicating whether the one or more applications exist on the user device 110. The user device 110 may then receive the web page data including links contextualized based on whether the one or more applications exist on the user device 110.

In some embodiments, the user device 110 may parse the static web page data to identify a referrer tag corresponding to one or more links included in the static web page data. The referrer tag may include information related to the link. The user device 110 may modify the referrer tag to include additional information, for example, a reference to a search query, an identification of the static web page, or a user identification.

According to some implementations, the hosting server 120 may receive static web page data from the web page developer device 130. The hosting server 120 may receive a request for the web page data from the user device 110, and transmit the static web page data to the user device 110. In some embodiments, the hosting server 120 may receive a search request from the user device 110. The static web page data may correspond to a web page identified as a relevant search result. The hosting server 120 may transmit the static web page data together with information corresponding to the search result to the user device 110.

In some embodiments, the web page data may include a referrer tag corresponding to one or more links included in the static web page data. The referrer tag may include information related to the link. The hosting server 120 may receive additional information, for example, a search query or a user identification, from the user device 110. The hosting server 120 may mutate the referrer tag to include the additional information and transmit the static web page data with the mutated referrer tag to the user device 110.

In some embodiments, the hosting server 120 may transmit information to the user device 110 identifying one or more applications referenced in the static web page data. The hosting server 120 may receive information from the user device 110 indicating whether the one or more applications exist on the user device 110. The hosting server 120 may select one or more links contained in the static web page data based on whether the corresponding application exists on the user device 110, and transmit the static web page data including the selected links to the user device 110.

According to some implementations, the web page developer device 130 may provide web page data to the hosting server 120. The web page data may be static web page data. In some embodiment, the static web page data may include a plurality of links corresponding to respective environments of the user device 110. One or more of the plurality of links may only be displayable on the user device 110 in the respective environment. In some embodiments, the static web page data may include a link to an application that may exist on the user device 110. The link to the application may instruct the user device 110 to attempt to open the application to a particular position of the application.

According to some embodiments, the static web page data may include one or more markups. An interpreter may analyze the static web page data and extract elements of the markups. The interpreter may construct contextualized links or select a link from a plurality of links based on the extracted elements and environmental information. A decorator may then render the web page from the static web page data including the constructed or selected link. According to some embodiments, the user device 110 may implement the interpreter and the decorator. According to some embodiments, the hosting server 120 may implement one or more functionalities of the interpreter and the decorator.

Figure 2:
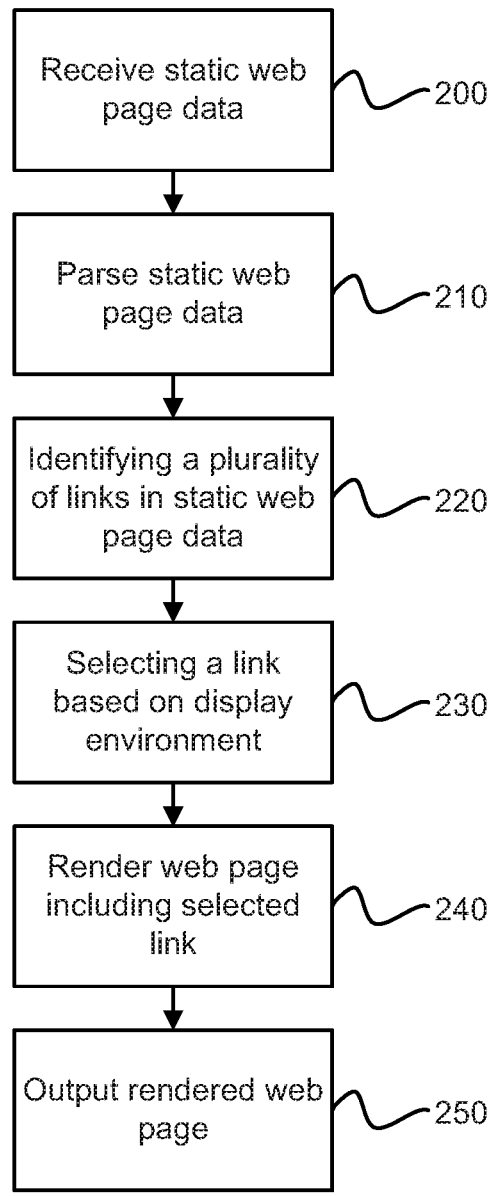
FIG. 2 is a flowchart illustrating a method according to an example embodiment.

FIG. 2 is a flowchart of a method according to an example embodiment. In some implementations, the method may be performed by a user device 110. The user device 110 receives 200 static web page data. The user device 110 parses 210 the static web page data and identifies 220 a plurality of links in the static web page data. According to some embodiments, the links may correspond to an environment of the user device 110, for example, an operating system of the user device 110. The user device 110 selects 230 a link of the plurality of links based on the environment of the user device 110. The user device 110 renders 240 the web page including the selected link, and outputs 250 the rendered web page.

Figure 3:
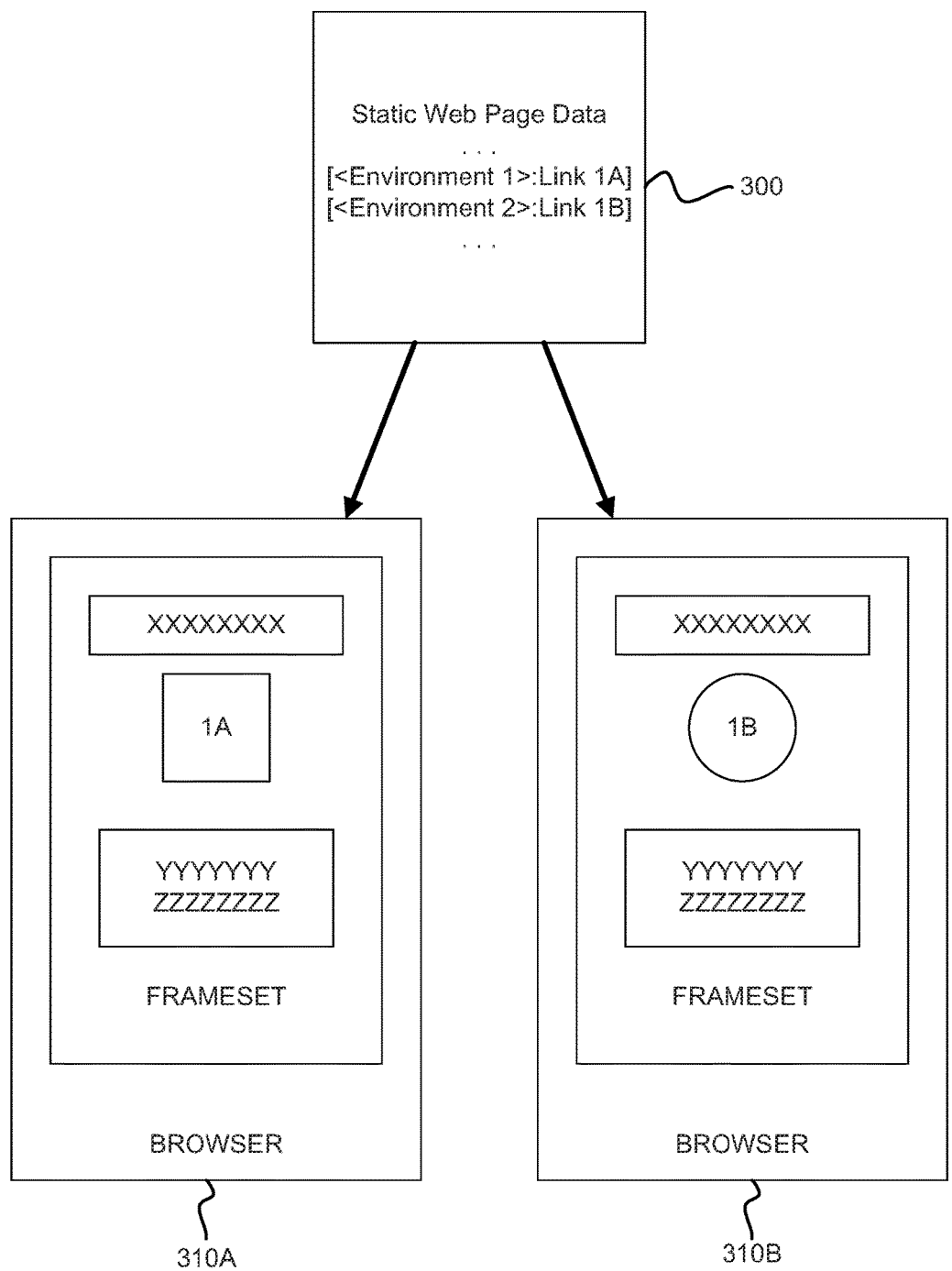
FIG. 3 illustrates an example implementation of the method of FIG. 2.

FIG. 3 illustrates an example implementation of the method of FIG. 2. The static web page data 300 includes Links 1A and 1B corresponding to Environments 1 and 2, respectively. In a case where the environment of the user device 110 is Environment 1, the web page is rendered and displayed 310A with Link 1A. Meanwhile, in a case where the environment of the user device 110 is Environment 2, the web page is rendered and displayed 310B with Link 1B. As a non-limiting example, Environments 1 and 2 may correspond to different operating systems executing on the user device 110. Link 1A may link to an application page in an application store of Environment 1, while Link 1B may link to the application page in an application store of Environment 2. When selected, Link 1A will direct the user device 110 to an application page appropriate for the first environment and Link 1B will direct the user device 110 to an application page appropriate for the second environment.

Figure 4:
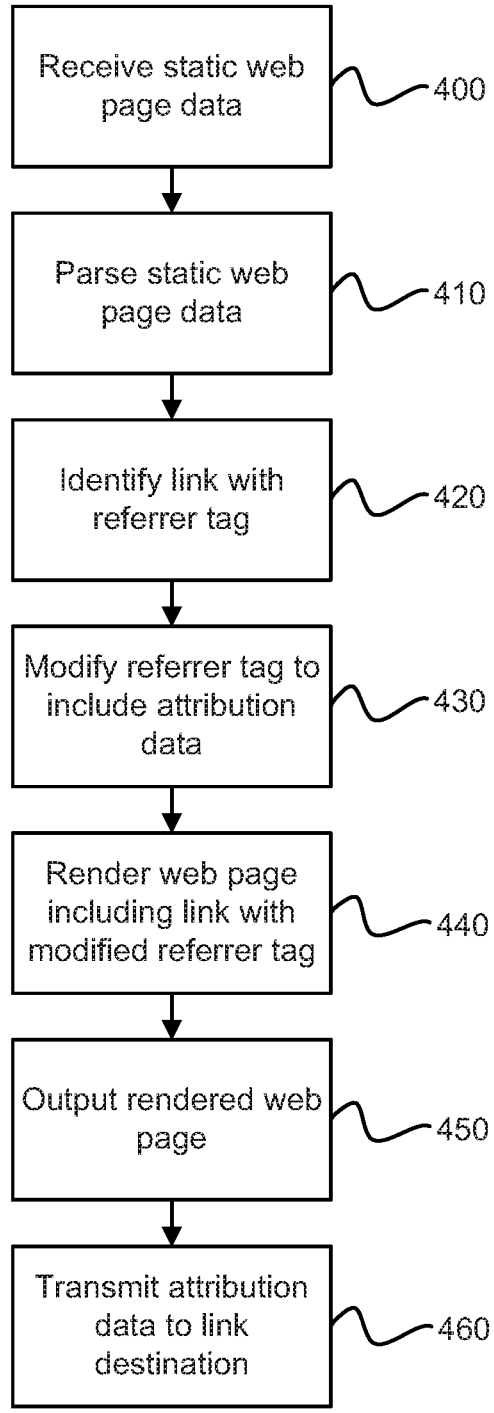
FIG. 4 is a flowchart illustrating a method according to an example embodiment.

FIG. 4 is a flowchart of a method according to an example embodiment. In some implementations, the method may be performed by a user device 110. The user device 110 receives 400 static web page data. The user device 110 parses 410 the static web page data and identifies 420 a link containing a modifiable referrer tag. According to some embodiments, the modifiable referrer tag may contain some attribution data corresponding to a page in which the link is found. The user device 110 may modify 430 the referrer tag to include additional attribution data. For example, the user device 110 may modify the referral tag to include attribution data corresponding to a user accessing the link and a search query that led to the web page data. The user device 110 may then render 440 the web page including the modified referrer tag and output 450 the rendered web page. When the link is selected, the user device 110 may transmit 460 the attribution data to the link destination and navigate to the link destination.

According to some embodiments, the hosting server 120 may parse 410 the static web page data, identify 420 the link with the referrer tag, and modify 430 the referrer tag to include attribution data. The hosting server 120 may then transmit static web page data to the user device 110 including the modified referrer tag. In some embodiments, the user device 110 may then immediately render the web page from the static web page data received from the hosting server 120. In some embodiments, the user device 110 may additionally parse 410 the static web page data received from the hosting server 120, identify 420 the link with the modified referrer tag, and then further modify 430 the referrer tag before rendering 440 the web page.

Figure 5:
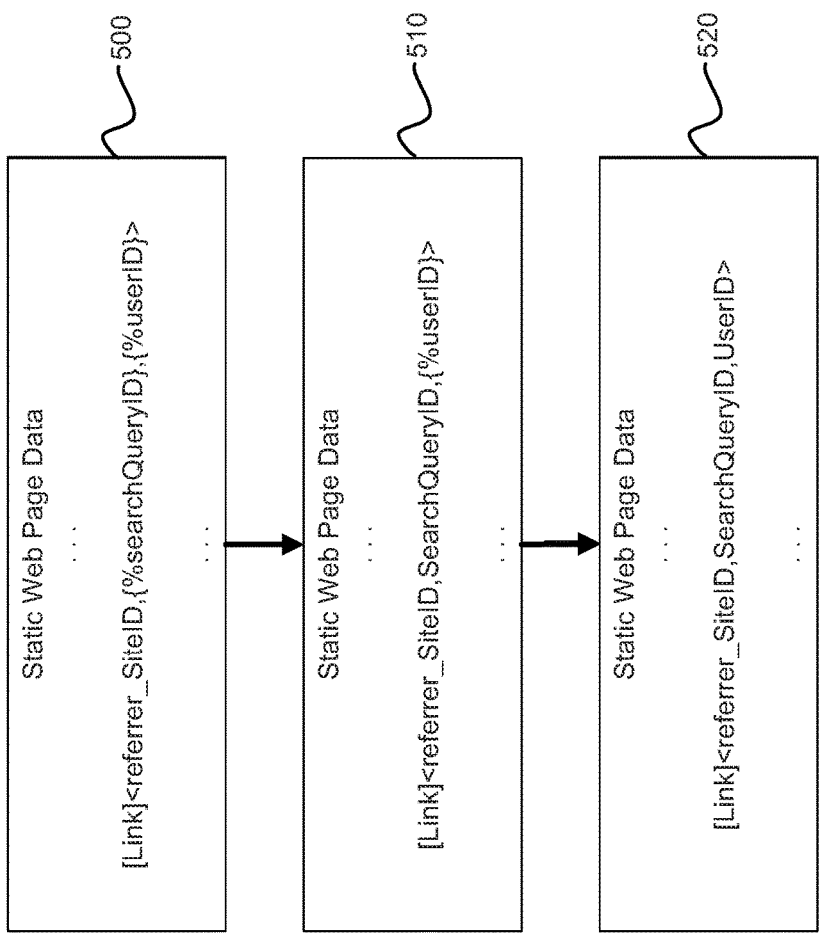
FIG. 5 illustrates an example implementation of the method of FIG. 4.

FIG. 5 illustrates an example implementation of the method of FIG. 4. The static web page data 500 includes a Link with a referrer tag. The referrer tag in 500 may include a reference to the page on which the Link exists, e.g., a SiteID. The referrer tag in 500 may identify attribution data to be added to the referrer tag, e.g., a user identification and search query information. In some embodiments, the hosting server 120 may modify the referrer tag to include the search query information, e.g., the SearchQueryID, as shown in 510. The hosting server 120 may then transmit the static web page data with the modified referrer tag to the user device 110. The user device 110 may further modify the referrer tag to include the user identification, e.g., the UserID, as shown in 520. The user device 110 may then render the web page using the static web page data having the modified referrer tag including the SiteID, the SearchQueryID, and the UserID. According to some embodiments, the user device 110 or the hosting server 120 may solely modify the referrer tag to include both the SearchQueryID and the UserID. In some embodiments, the referrer tag in the original static web page data 500 may not explicitly identify attribution information to be added by the hosting server 120 or the user device 110.

Figure 6:
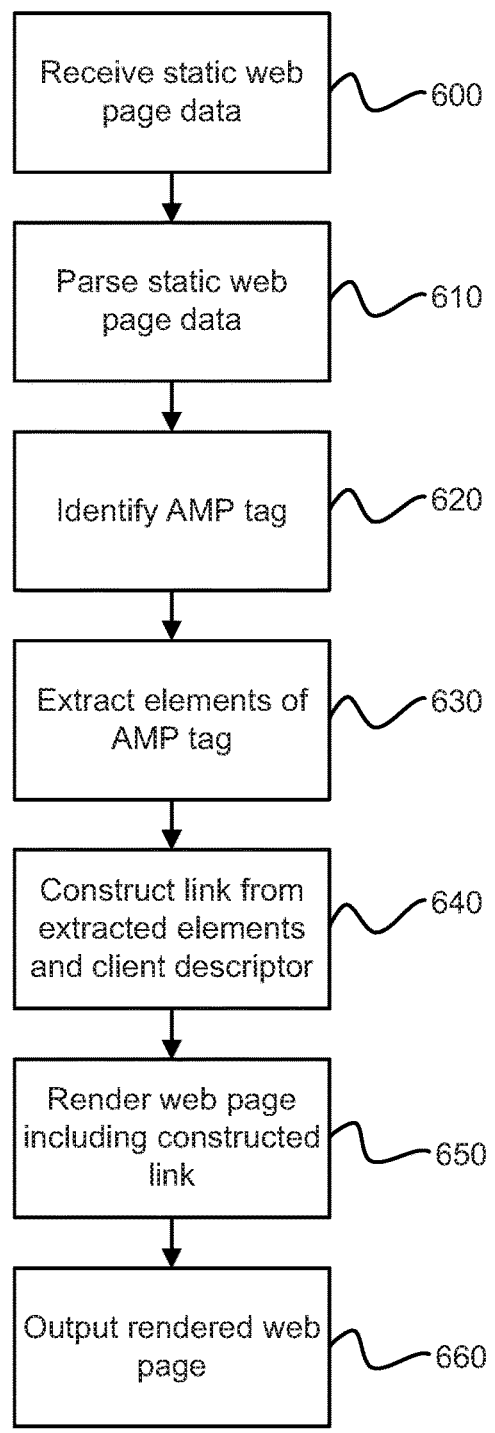
FIG. 6 is a flowchart illustrating a method according to an example embodiment.

FIG. 6 is a flowchart of a method according to an example embodiment. In some implementations, the method may be performed by a user device 110. The user device 110 receives 600 static web page data. The user device 110 parses 610 the static web page data and identifies 620 an AMP tag including data elements with information to populate a link. The user device 110 extracts 630 the data elements and constructs 640 a link based on the data elements and a client descriptor. The user device 110 renders 650 the web page including the constructed link and outputs 660 the rendered web page.

In some embodiments, the hosting server 120 may parse 610 the static web page data, identify 620 the AMP tag, extract 630 the data elements, construct 640 the link, and modify the static web page data to include the constructed link. The hosting server 120 may then transmit the static web page data including the constructed link to the user device 110 for rendering 650 and outputting 660 of the web page.

Figure 7:
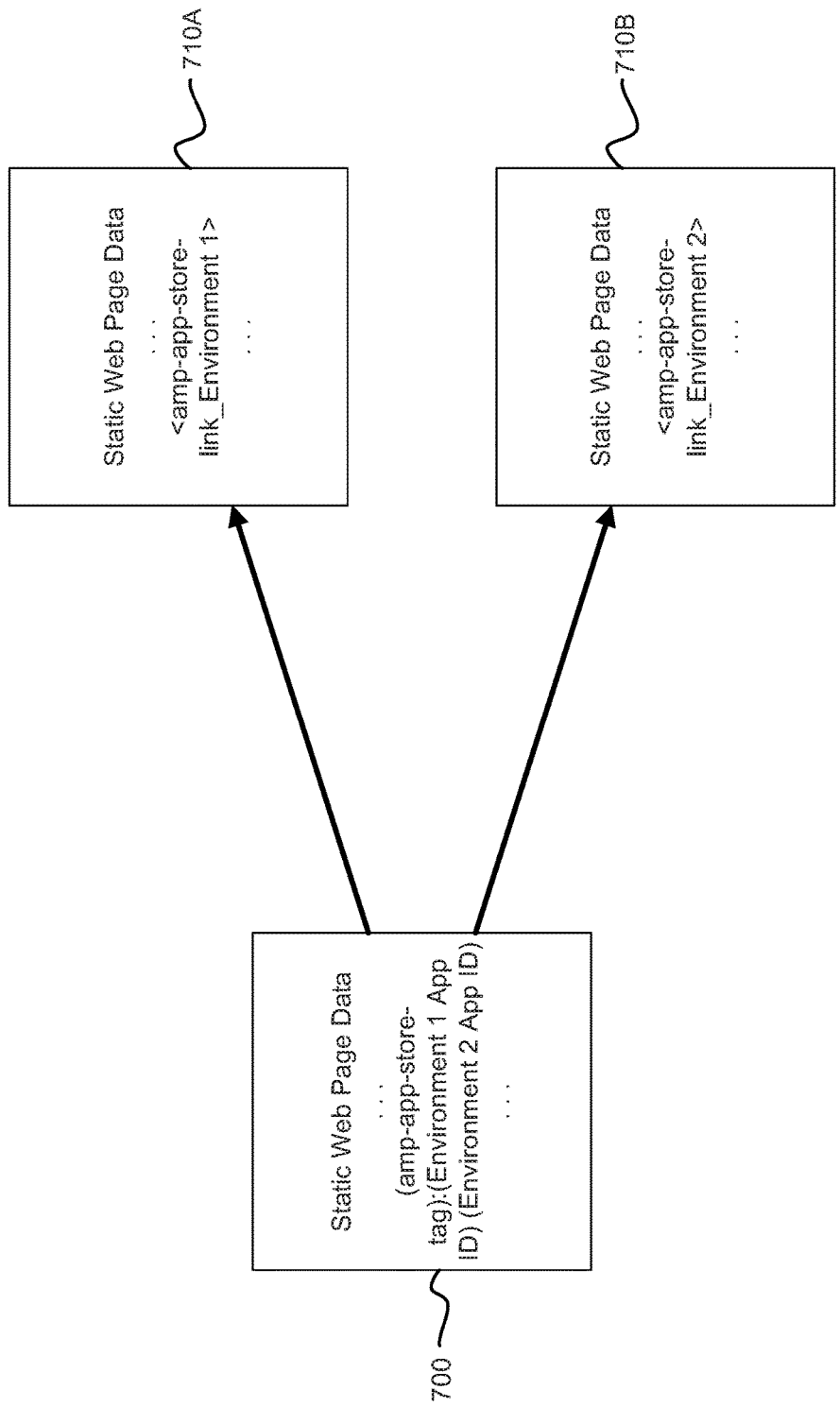
FIG. 7 illustrates an example implementation of the method of FIG. 6.

FIG. 7 illustrates an example implementation of the method of FIG. 6. The static web page data 700 includes an AMP app store tag including data elements of App IDs corresponding to Environments 1 and 2. If the user device 110 is in the first operating environment, an app-store link to Environment 1 may be constructed, as shown in 710A. If the user device 110 is in the second operating environment, an app-store link to Environment 2 may be constructed, as shown in 710B.

As a non-limiting example, the AMP tag data element may include an iOS app ID and an Android package name for an application, and the client descriptor may indicate whether the user device 110 operates using an Android operating system or a mobile iOS operating system. If the user device 110 operates using an Android operating system, the user device 110 may construct a link to the application in the Google Play store. If the user device 110 operates using a mobile iOS operating system, the user device may construct a link to the application in the iOS app store.

Figure 8:
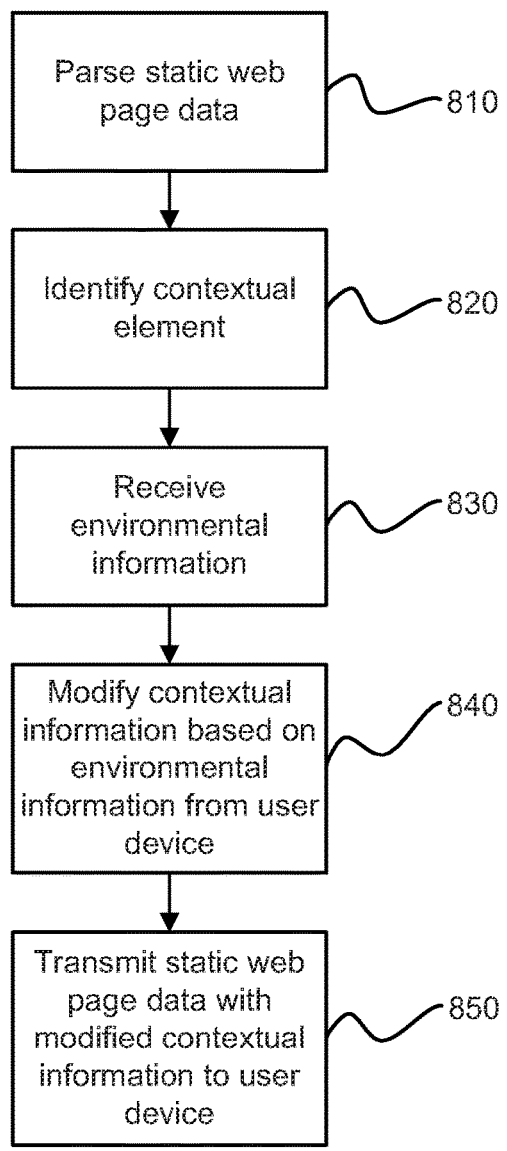
FIG. 8 is a flowchart illustrating a method according to an example embodiment.

FIG. 8 is a flowchart of a method according to an example embodiment. In some implementations, the method may be performed by the hosting server 120. The hosting server 120 may parse 810 static web page data and identify 820 a contextual element. For example, the contextual information may include a plurality of links corresponding to respective user device environments, a mutatable referrer tag, or an AMP tag. The hosting server 120 receives 830 environmental information on an environment of the user device 110. For example, the environmental information may indicate an operating system of the user device 110 or whether one or more applications exist on the user device 110. The hosting server 120 modifies 840 the contextual information based on the environmental information. For example, the hosting server 120 may construct a link to an appropriate app installation for the operating system of the user device 110, or a link directing to an application installation page or a link opening the application based on whether the application exists on the user device 110. The hosting server 120 transmits 850 the static web page data with the modified contextual information to the user device 110.

Figure 9:
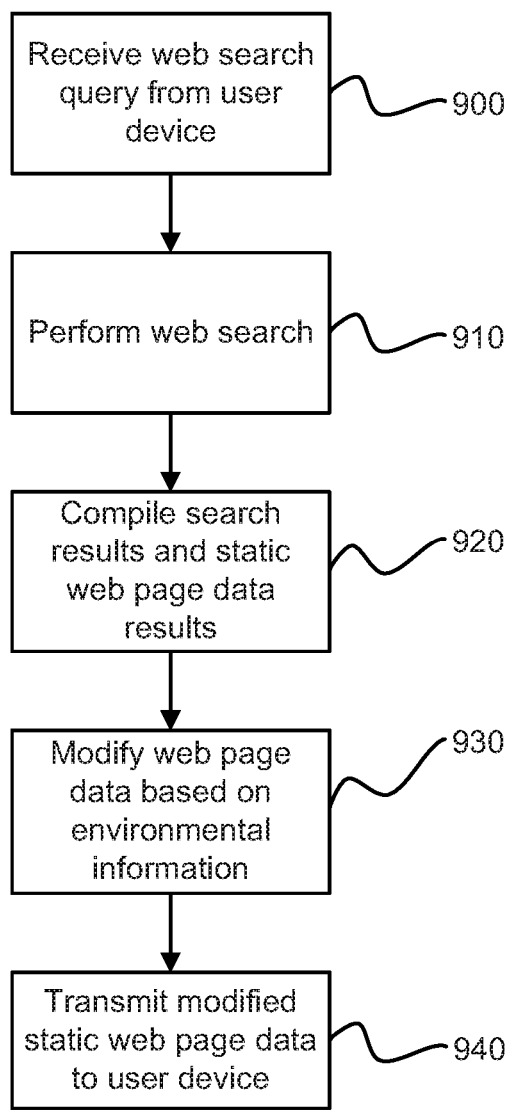
FIG. 9 is a flowchart illustrating a method according to an example embodiment.

FIG. 9 is a flowchart of a method according to an example embodiment. In some implementations, the method may be performed by the hosting server 120. The hosting server 120 receives 900 a web search query from the user device 110. The hosting server 120 performs 910 a search based on the web search query. The hosting server 120 compiles 920 search results and static web page data corresponding to the search results. The hosting server 120 modifies 930 the static web page data based on environmental information and transmits 940 the search results and the modified web page data to the user device 110. The user device 110 may then render web pages corresponding to the modified web page data and display the web pages. In some embodiments, hosting server 120 may transmit the search results and the unmodified static web page data to the user device 110, and the user device may modify 930 the static web page data.

Figure 10:
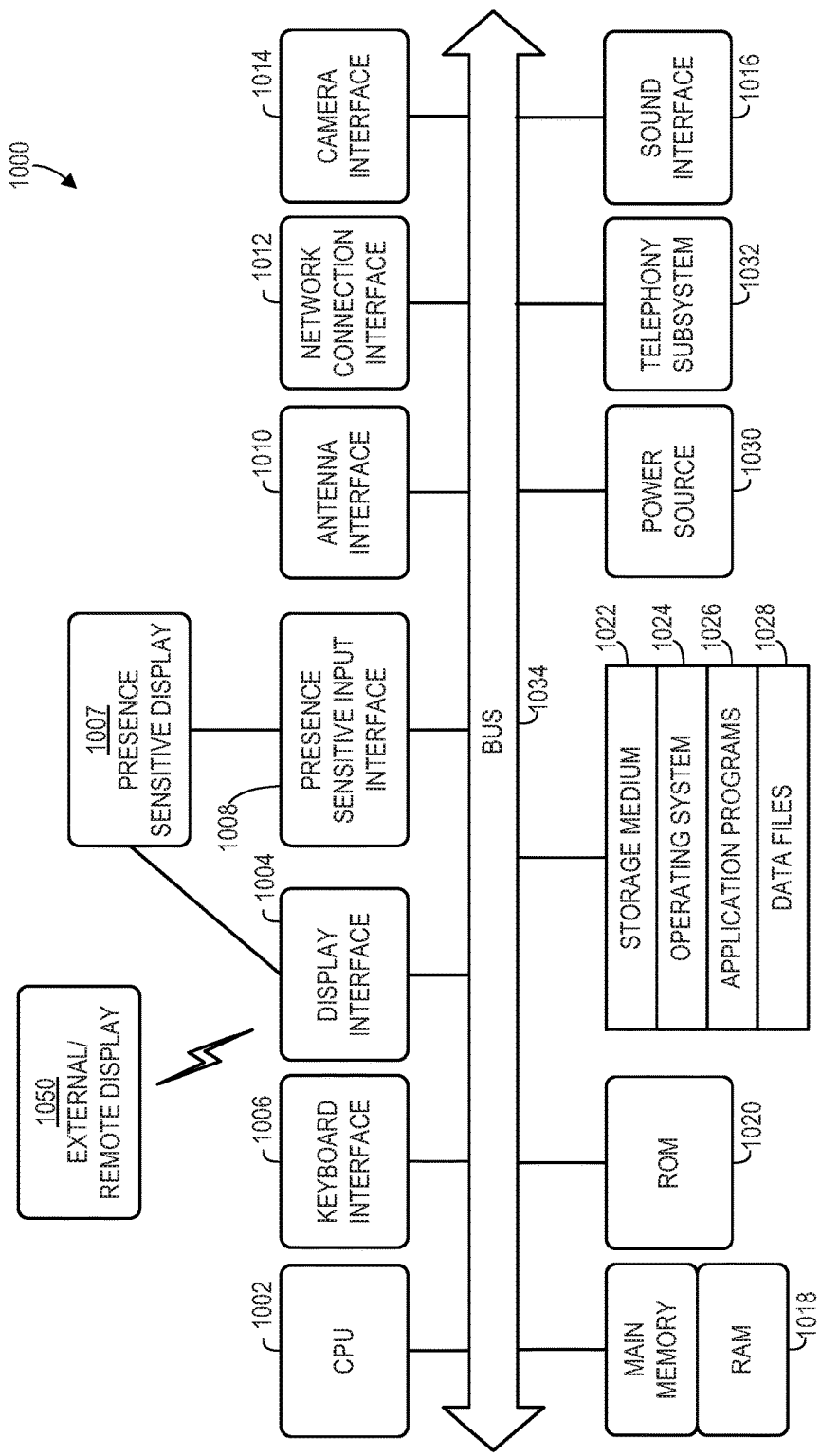
FIG. 10 is a block diagram of an illustrative computer system architecture according to an example implementation.

FIG. 10 is a block diagram of an illustrative computer system architecture 1000, according to an example implementation. For example, the user device 110, the hosting server 120, and the domain registrar server 130 may be implemented using one or more elements from the computer system architecture 1000. It will be understood that the computing device architecture 1000 is provided for example purposes only and does not limit the scope of the various implementations of the present disclosed systems, methods, and computer-readable mediums.

The computing device architecture 1000 of FIG. 10 includes a central processing unit (CPU) 1002, where computer instructions are processed, and a display interface 1004 that acts as a communication interface and provides functions for rendering video, graphics, images, and texts on the display. In certain example implementations of the disclosed technology, the display interface 1004 may be directly connected to a local display, such as a touch-screen display associated with a mobile computing device. In another example implementation, the display interface 1004 may be configured for providing data, images, and other information for an external/remote display 1050 that is not necessarily physically connected to the mobile computing device. For example, a desktop monitor may be used for mirroring graphics and other information that is presented on a mobile computing device. In certain example implementations, the display interface 1004 may wirelessly communicate, for example, via a Wi-Fi channel or other available network connection interface 1012 to the external/remote display 1050.

In an example implementation, the network connection interface 1012 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 1004 may be operatively coupled to a local display, such as a touch-screen display associated with a mobile device. In another example, the display interface 1004 may be configured to provide video, graphics, images, text, other information, or any combination thereof for an external/remote display 1050 that is not necessarily connected to the mobile computing device. In one example, a desktop monitor may be used for mirroring or extending graphical information that may be presented on a mobile device. In another example, the display interface 1004 may wirelessly communicate, for example, via the network connection interface 1012 such as a Wi-Fi transceiver to the external/remote display 1050.

The computing device architecture 1000 may include a keyboard interface 1006 that provides a communication interface to a keyboard. In one example implementation, the computing device architecture 1000 may include a presence-sensitive display interface 1008 for connecting to a presence-sensitive display 1007. According to certain example implementations of the disclosed technology, the presence-sensitive display interface 1008 may provide a communication interface to various devices such as a pointing device, a touch screen, a depth camera, etc. which may or may not be associated with a display.

The computing device architecture 1000 may be configured to use an input device via one or more of input/output interfaces (for example, the keyboard interface 1006, the display interface 1004, the presence sensitive display interface 1008, network connection interface 1012, camera interface 1014, sound interface 1016, etc.) to allow a user to capture information into the computing device architecture 1000. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1000 or may be a separate device. For example, the input device may be an accelerometer, a magnetometer, a digital camera, a microphone, and an optical sensor.

Example implementations of the computing device architecture 1000 may include an antenna interface 1010 that provides a communication interface to an antenna; a network connection interface 1012 that provides a communication interface to a network. As mentioned above, the display interface 1004 may be in communication with the network connection interface 1012, for example, to provide information for display on a remote display that is not directly connected or attached to the system. In certain implementations, a camera interface 1014 is provided that acts as a communication interface and provides functions for capturing digital images from a camera. In certain implementations, a sound interface 1016 is provided as a communication interface for converting sound into electrical signals using a microphone and for converting electrical signals into sound using a speaker. According to example implementations, a random access memory (RAM) 1018 is provided, where computer instructions and data may be stored in a volatile memory device for processing by the CPU 1002.

According to an example implementation, the computing device architecture 1000 includes a read-only memory (ROM) 1020 where invariant low-level system code or data for basic system functions such as basic input and output (I/O), startup, or reception of keystrokes from a keyboard are stored in a non-volatile memory device. According to an example implementation, the computing device architecture 1000 includes a storage medium 1022 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1024, application programs 1026 (including, for example, a web browser application, a widget or gadget engine, and or other applications, as necessary) and data files 1028 are stored. According to an example implementation, the computing device architecture 1000 includes a power source 1030 that provides an appropriate alternating current (AC) or direct current (DC) to power components.

According to an example implementation, the computing device architecture 1000 includes a telephony subsystem 1032 that allows the device 1000 to transmit and receive sound over a telephone network. The constituent devices and the CPU 1002 communicate with each other over a bus 1034.

According to an example implementation, the CPU 1002 has appropriate structure to be a computer processor. In one arrangement, the CPU 1002 may include more than one processing unit. The RAM 1018 interfaces with the computer bus 1034 to provide quick RAM storage to the CPU 1002 during the execution of software programs such as the operating system application programs, and device drivers. More specifically, the CPU 1002 loads computer-executable process steps from the storage medium 1022 or other media into a field of the RAM 1018 in order to execute software programs. Data may be stored in the RAM 1018, where the data may be accessed by the computer CPU 1002 during execution.

The storage medium 1022 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1022, which may include a machine-readable storage medium.

According to one example implementation, the term computing device, as used herein, may be a CPU, or conceptualized as a CPU (for example, the CPU 1002 of FIG. 10). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

According to some implementations, the computer program code may control the computing device to parse and render static web page data according to one or more example embodiments. In some implementations, the computer program code may control the computing device to provide parse and modify static web page data according to one or more example embodiments. The computer program code may modify a browser to implement an interpreter and decorator according to some embodiments.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims and their equivalents. Although specific terms are employed herein, they are used in a generic and descriptive sense only and not for purposes of limitation.

In the foregoing description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementation," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms should be construed to take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a-given sequence, either temporally, spatially, in ranking, or in any other manner.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
  receiving, by a computing device, static web page data of a web page, the static web page data containing a plurality of mutually alternative links;
  responsive to receiving the static web page data, parsing, by the computing device, the static web page data to identify the plurality of mutually alternative links;

responsive to determining that an application referenced by each of the plurality of mutually alternative links does not exist on the computing device, selecting, by the computing device and based on a first operating system of the computing device, a first link of the plurality of mutually alternative links, wherein the mutually alternative links include a second link that corresponds to a second operating system that is different from the first operating system and wherein the first link is selected and the second link is not selected based on the computing device being configured to run the first operating system and not the second operating system;

rendering, by the computing device and from the static web page data, the static web page including only the first link for a first application store for the application that corresponds to the first operating system, wherein the second link corresponds to a second application store for the second operating system; and outputting, for display, the rendered web page.

2. The method of claim 1, wherein the first application store includes a download area for downloading the application.

3. The method of claim 1, further comprising:
responsive to determining that the application exists on the computing device, selecting a third link that opens the application.

4. The method of claim 3, further comprising:
receiving, by the computing device, an indication of a user selection of the third link; and
responsive to receiving the indication, initiating, by the computing device, an opening of the application.

5. The method of claim 4, further comprising:
in response to the opening of the application being unsuccessful, navigating, by the computing device, to an application page in the first application store corresponding to the first operating system of the computing device.

6. The method of claim 1, further comprising:
transmitting, by the computing device, a search query request, wherein the receiving comprises receiving, by the computing device and in response to the search query request, a plurality of search results together with the static web page data, the static web page data corresponding to a search result of the plurality of search results and
storing a result of the determining of whether the application exists on the computing device in a memory.

7. The method of claim 6, further comprising:
receiving, by the computing device, an indication of a user selection of the first link within the rendered web page;
responsive to receiving the indication, opening an application store location corresponding to the first operating system of the computing device for the application, wherein identifying the application, determining whether the application exists, and storing the result are performed prior to receiving the indication of the user selection of the first link.

8. The method of claim 1, wherein:
determining that the application referenced by each of the plurality of mutually alternative links includes determining that the application is not installed on the computing device; and
the first link corresponds to an application installation page for the first operating system.

9. A method, comprising:
receiving, by a computing device, static web page data of a web page, the static web page data including an accelerated mobile page (AMP) tag;
responsive to receiving the static web page data, parsing, by the computing device, the static web page data to identify the AMP tag;
extracting, by the computing device, data elements from within the AMP tag;
responsive to determining that an application does not exist on the computing device, constructing, by the computing device and based on the extracted data elements and a first operating system of the computing device, a first link;
rendering, by the computing device and from the static web page data and the first link for a first application store for the application that corresponds to the first operating system, the static web page including the first link; and
outputting, for display, the rendered web page.

10. The method of claim 9, wherein:
the computing device determined to not select a second link corresponding to a second application store for a second operating system based on the computing device running the first operating system.

11. The method of claim 9, further comprising:
responsive to determining that the application exists on the computing device, constructing, by the computing device and based on the extracted data elements of the computing device, a second link that opens the application.

12. A method, comprising:
receiving, by a computing device, static web page data of a web page, the static web page data comprising a referrer tag corresponding to a plurality of mutually alternative links;
responsive to receiving the static web page data, parsing, by the computing device, the static web page data to identify the referrer tag corresponding to the plurality of mutually alternative links;
responsive to determining that an application referenced by each of the plurality of mutually alternative links does not exist on the computing device, selecting by the computing device and based on a first operating system of the computing device, a first link of the plurality of mutually alternative links, wherein the plurality of mutually alternative links include a second link that corresponds to a second operating system and the computing device is not configured to run the second operating system;
modifying, by the computing device, the identified referrer tag to include attribute information;
rendering, by the computing device and from the static web page data and modified referrer tag, the web page including the first link for a first application store for the application that corresponds to the first operating system, wherein the second link corresponds to a second application store for the second operating system and the first link is associated with the modified referrer tag; and
outputting, for display, the rendered web page.

13. The method of claim 12, wherein the modifying comprises modifying, by the computing device, the referrer tag to include information corresponding to user identification information of a user of the computing device.

14. The method of claim 12, further comprising:
transmitting, by the computing device, a search query request, wherein the receiving comprises receiving, by the computing device and in response to the search query request, a plurality of search results together with the static web page data, wherein the static web page data corresponds to a search result of the plurality of search results, and wherein the modifying comprises modifying, by the computing device, the referrer tag to include information indicative of the search query request.

15. The method of claim 12, further comprising:

receiving, by the computing device, an indication of a selection of the first link; and responsive to receiving the indication, initiating, by the computing device, a navigation to a destination corresponding to the first link and transmitting the attribute information to the destination.

16. A method, comprising:

receiving, by a computing device, a web search query from a user device;

performing, by the computing device, a search based on the web search query;

compiling, by the computing device, a plurality of search results and static web page data of a web page corresponding to a search result of the plurality of search results, the static web page data comprising a contextual element and a plurality of mutually alternative links;

parsing, by the computing device, the static web page data to identify the contextual element and the plurality of mutually alternative links;

modifying, by the computing device and based on contextual information, the contextual element within the static web page data; and transmitting, to the user device, the search results together with the static web page data containing the modified contextual element, wherein the user device is configured to determine that an application referenced by each of the plurality of mutually alternative links does not exist on the computing device, select based on a first operating system, a first link of the plurality of mutually alternative links, the mutually alternative links including a second link that corresponds to a second operating system that is not selected based on the user device being configured to run the first operating system and not the second operating device, the user device is configured to render and display the web page including the modified contextual element, the first link is for a first application store that corresponds to the first operating system, and the second link corresponds to a second application store for the second operating system.

17. The method of claim 16, further comprising:

receiving, by the computing device, environmental information from the user device, the contextual information comprising the received environmental information, wherein the modifying comprises modifying, by the computing device, the contextual element based on the received environmental information and the environmental information includes an indication that the user device runs on the first operating system.

18. The method of claim 16, wherein:

the contextual element comprises a link and a corresponding referrer tag, and the modifying comprises modifying the corresponding referrer tag to include information corresponding to the web search query.

19. The method of claim 17, further comprising:

receiving, by the computing device, user identification information from the user device, the contextual information comprising the received user identification information, wherein the contextual element comprises a link and a corresponding referrer tag, and wherein the modifying comprises modifying the corresponding referrer tag to include information corresponding to the received user identification information.

* * * * *